(12) United States Patent
Realmuto et al.

(10) Patent No.: US 7,872,375 B2
(45) Date of Patent: Jan. 18, 2011

(54) MULTIPLE BI-DIRECTIONAL INPUT/OUTPUT POWER CONTROL SYSTEM

(75) Inventors: Richard A. Realmuto, Commack, NY (US); Ben Hartman, New York, NY (US)

(73) Assignee: Nextek Power Systems, Inc., Detroit, MI (US)

( * ) Notice: Subject to any disclaimer, the term of this patent is extended or adjusted under 35 U.S.C. 154(b) by 182 days.

(21) Appl. No.: 12/406,519

(22) Filed: Mar. 18, 2009

(65) Prior Publication Data
US 2009/0179499 A1    Jul. 16, 2009

Related U.S. Application Data

(60) Division of application No. 10/977,546, filed on Oct. 28, 2004, now abandoned, and a continuation-in-part of application No. 10/761,979, filed on Jan. 21, 2004, now Pat. No. 7,227,278.

(51) Int. Cl.
*H02J 4/00* (2006.01)
(52) U.S. Cl. ...................................................... 307/80
(58) Field of Classification Search ............... 307/80, 307/64–66
See application file for complete search history.

(56) References Cited

U.S. PATENT DOCUMENTS

| | | | | |
|---|---|---|---|---|
| 5,929,537 | A * | 7/1999 | Glennon | 307/46 |
| 6,501,194 | B1 * | 12/2002 | Jiang et al. | 307/66 |
| 7,485,987 | B2 * | 2/2009 | Mori et al. | 307/63 |
| 7,812,575 | B2 * | 10/2010 | Shimada et al. | 323/222 |

* cited by examiner

*Primary Examiner*—Albert W Paladini
(74) *Attorney, Agent, or Firm*—Kirschstein, et al.

(57) ABSTRACT

A multiple bi-directional input/output power control system includes a network of functional blocks housed in a single enclosure, providing DC power to one or more DC loads, and providing control and internal pathways, sharing one or more AC and/or DC power inputs. The system feeds back AC power from the DC power source into an AC input connection, and the fed-back AC power is shared by other AC loads. The system operates at least one alternative source of DC in a dynamic manner, allowing maximization of power generating capability at respective specific operating conditions of the moment. Power isolation may be handled by an AC isolation block right at a power input. Therefore all other blocks within a multi-function power control unit (MFPCU) are isolated from AC ground.

23 Claims, 6 Drawing Sheets

MULTIPLE BI-DIRECTIONAL INPUT/OUTPUT POWER CONTROL SYSTEM

CROSS REFERENCE TO RELATED APPLICATION

This application is a division of U.S. patent application Ser. No. 10/977,546, filed Oct. 28, 2004, which is a continuation-in-part of U.S. patent application Ser. No. 10/761,979, filed Jan. 21, 2004, now U.S. Pat. No. 7,227,278.

FIELD OF THE INVENTION

The present invention relates to electrical power units for use in sharing and connecting AC alternating current and DC direct current electrical power supplies.

SUMMARY OF THE INVENTION

The Multi-Function Power Control Unit (MFPCU) of this invention is a network of functional blocks housed in a single enclosure to provide DC power to one or more DC loads. It provides control and internal pathways to share or select a variety of power inputs including AC utility power, alternative DC power sources, as well as DC power from external energy storage devices. Additionally, the MFPCU can also feed back AC power from other attached DC sources into the AC input connection to be shared by other AC loads (including other MFPCU's) within the enterprise. The functional blocks are implemented as hard wired electronic circuit boards, as software running on an internal digital processor, or as a combination of both types using state-of-the-art design techniques.

The multi-function power control unit includes the following functional blocks within its enclosure: a digital processor, a low voltage ON/OFF control block, an alternate DC source DC/DC converter, a DC isolation block, and a bi-directional AC/DC power supply with a bi-directional control module, power factor correction means, and an anti-islanding control block. In addition, the MFPCU has connectors for the following: AC input, DC load, external energy storage device, alternate DC power source, external control device, and central data acquisition and control. The AC input is typically designed for single phase 208-277 VAC at 50 or 60 Hz. Alternatively, the AC input can be designed for three phase 208-480 VAC at 50 or 60 Hz.

The multi-function power control unit operates an alternative source of DC direct current, in conjunction with an AC source of power or DC power storage device, in a dynamic manner that allows maximum power generating capability of the alternative source of DC direct current at the specific operating conditions of the moment. It also can deliver power in excess of that required by a DC compatible load to the AC source of power, DC power storage device, or both in a shared manner.

The system includes three major subsystems:

a Bi-directional Microprocessor-Controlled 4.5 kW AC to DC Power Supply;

a Buck/Boost DC-to-DC Converter with dynamic voltage control; and, a DC-Based Meter Monitoring of the AC I/O, DC I/O, and internal voltages and currents, which is based on a unique Metering and Control Module (MCM).

The aforementioned bi-directional AC/DC power supply of the present invention includes an AC/DC converter that performs three functions based upon signal from Digital Processor, including the following:

1) rectifies AC and provides regulated DC voltage (via DC isolation) when required by the load or Alternate DC source;

2) rectifies AC and provides regulated DC voltage to an external energy storage device; and, 3) inverts DC power from the alternate DC source or external energy storage and sends it back to the AC System.

A power factor correction means adjusts the power factor of the unit to a specified value.

An anti-islanding means including analog and/or digital logic circuits is used to detect loss of connection to utility grid or external synchronization source.

A bi-directional control module includes an analog and/or digital logic device that enables the bi-directional power supply to "invert" DC power. If this module is not installed the unit can only provide the above noted functions "1" and "2" but cannot provide function "3".

A DC isolation means electrically isolates DC output from AC input.

The bi-directional power supply powers a DC Load with High Voltage (250-400 Volts). The Direct Current (DC) load is a device that consumes power, such as a lighting ballast; lamp; solid state lighting, such as a light emitting diode (LED); a DC motor; an AC motor with variable frequency drive (VFD); or an Inverter. The load may feed power backwards for short durations, such as during braking of a motor.

A low voltage ON/OFF control shuts down all output circuits via a low voltage signal or via wireless communication device. However, another variation allows for a variable signal to dynamically control the voltage of the output circuits.

An alternate DC source DC/DC converter converts output of an alternate energy source to a voltage level suitable for the DC load. This converter has the ability to dynamically change the operating characteristics of an alternative energy source to permit optimization of power transfer or for proper interface with an alternative energy source, such as a photovoltaic (PV) device, a wind turbine, a fuel cell, or an engine driven cogeneration device.

In another variation, the converter is used to provide DC power back to the alternative energy source during periods of inactivity. For example, a wind turbine needs to maintain its direction into the wind, and yaw motors operate during periods of low wind before power production is achievable. Another example is the start-up of a fuel cell or cogeneration system, which may require fuel pumps, cooling pumps or other auxiliary equipment to be running before power production is achievable.

An external energy storage device stores DC power for use in supplying power to the DC load and/or alternate energy source, in the event of a loss of AC power, supplementing power to DC load when required, or supplementing power to AC system. Examples include a high voltage battery, a low voltage battery with DC/DC converter, a flow Battery, a flywheel, and a capacitor.

A digital processor monitors and controls power delivery to and from all sources and loads. The digital processor provides an interface for providing data and receiving control signals from the external central data acquisition and control unit. It may provide the following controls:

1) dynamic voltage control and/or current control supplied by an alternate DC Source;

2) an ON/OFF control of all output circuits;

3) an ON/OFF control for the bi-directional AC/DC power Supply;

4) dynamically change output voltage; and 5) dynamically change voltage of the DC link.

The digital processor also supplies the following data, if requested or required by the external central data acquisition and control unit:

1) volts, amps, and/or power delivered/supplied by the bi-directional AC/DC power supply;
2) volts, amps, and/or power delivered/supplied by the alternate DC source;
3) volts, amps, and/or power delivered/supplied by the external energy storage device;
4) volts, amps, and/or power delivered/supplied by the load; and,
5) system status, alarms, operating mode (i.e.: start-up, run, power failure, shutdown, fault, etc.)

The central data acquisition and control unit is used to provide the ability for central control and data collection of multiple power units, via their digital processors. It may be used for enterprise level and/or multi-building control, such as load management of utility feeder servicing multiple buildings.

The performance of the multi-function power control system of this invention for supplying a high efficiency lighting system is as follows: At this time, AC input high efficiency T-8 lighting ballasts operate an overall efficiency of 88%. A high voltage DC ballast is expected to operate at 94% efficiency. The multi-function power control system unit is expected to achieve a throughput efficiency of 96%. Thus, when combined, the overall efficiency can be 90%, which is 2% better than current systems. The main reason for the increase is due to the larger scale AC/DC power supply. This is analogous to central power plants with a distribution system being more efficient than the equivalent sum of multiple smaller scale power plants.

A larger scale system is also proposed. The current design is for a power unit that is sized to meet the requirements of a single phase 277 V lighting circuit (up to 4.5 kW). An upgrade is a three phase unit capable of supplying multiple lighting circuits, via a DC distribution system, and a single interconnection to the AC system. The larger scale system can be from 15 to 250 kW.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
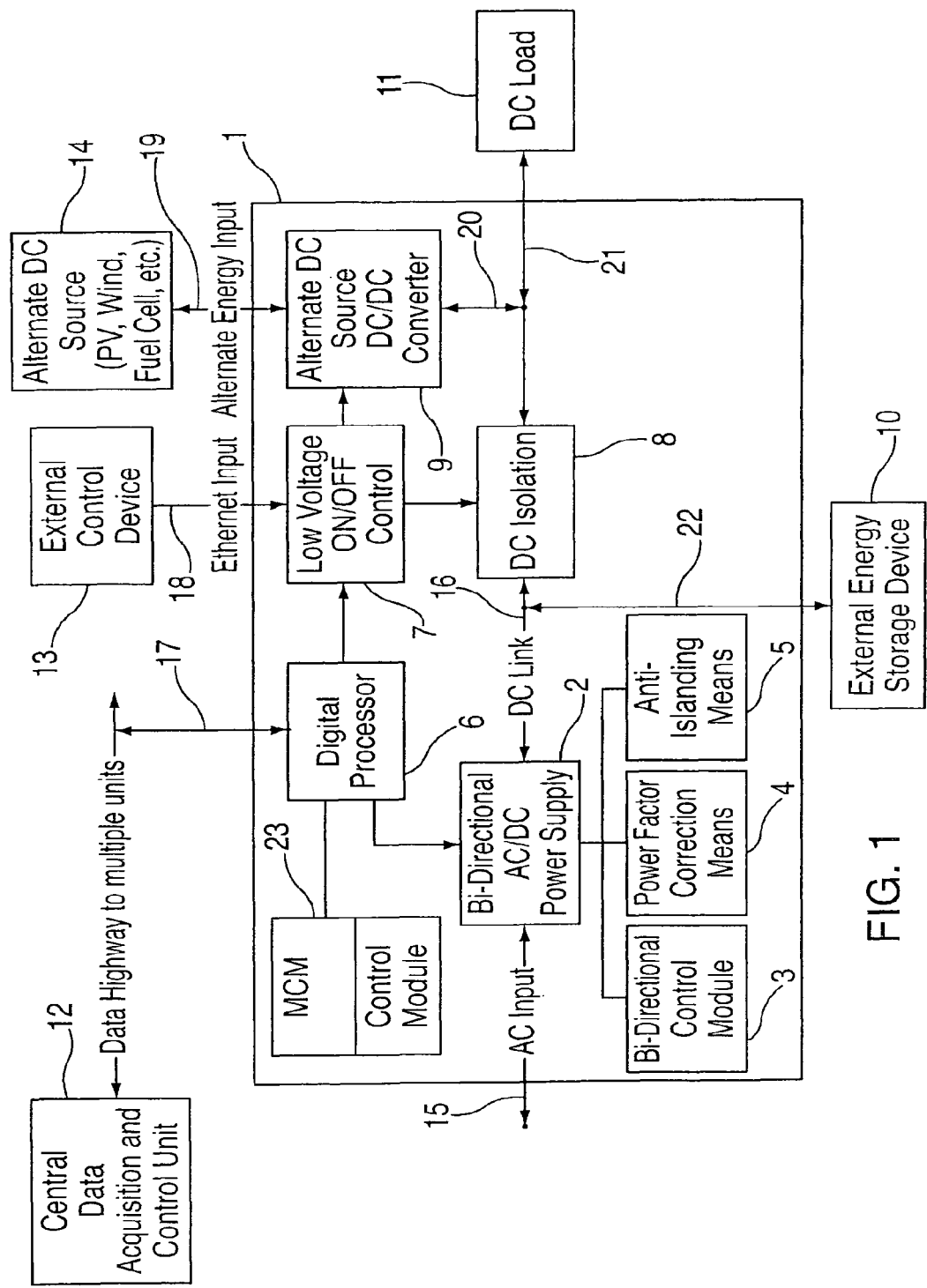
FIG. 1 is a Block diagram of a multi-function power control unit (MFPCU) of this invention with external attachment blocks.

FIG. 1 shows a block diagram of MFPCU 1 with a network of various functional blocks within and connections to other functional blocks at its periphery. bi-directional AC/DC Power Supply 2 is transformer isolated and has a bridge topology which incorporates MOSFETS or preferably IGBT's (insulated gate bipolar transistors) which permit operation as both a synchronous rectifier for supplying DC as well as an inverter to supply AC at its input from DC sources. bi-directional Control Module 3 controls the operation as to direction, while Power Factor Control Means 4 insures that power factor at the AC input remains essentially at unity. The Anti-Islanding Means 5 detects loss of AC utility power and blocks the feedback of AC power at the connection 15 from DC sources. Power supply 2 is controlled by Digital Processor 6. Low Voltage ON/OFF control 7 receives signals (such as emergency situations) from external control devices 13 via line 18 to shut down Alternate DC Source DC/DC Converter 9 or DC Isolation block 8. Alternate DC Sources 14 such as photovoltaic, wind turbines, fuel cells, etc. are connected via line 19. The connection is shown as bi-directional since the alternate DC sources may require power in some off modes such as for yaw motors for wind turbines or pumps which are required at start-up of fuel cells. DC Load 11 is connected via line 21 which is also shown as bi-directional wherein, on some occasions, DC loads can generate power. One example is a DC motor after shutdown which can act as a generator for a brief period.

External energy storage device 10 stores DC power for use in supplying power to the DC load and/or alternate energy source, in the event of a loss of AC power, supplementing power to DC load when required, or supplementing power to AC system. Examples include a high voltage battery, a low voltage battery with DC/DC converter, a flow Battery, a flywheel, and a capacitor. External Energy Device 10 is connected via line 22. This connection is also bi-directional since a variety of energy storage devices require power during the charging phase. Simple chemical storage batteries such as lead acid or NiMH require periodic charging. Flow batteries require the use of circulation pumps in the charging process, and the motor/generator of a flywheel storage device is used as a motor to "charge" or spin-up the flywheel.

FIG. 1 also shows metering control module (MCM) 23, which contains various current and voltage sensors sampling the various sources and load points. These are all connected in a metering network, including metering control module 23, to digital processor 6. Central Data Acquisition and Control Unit 12 is an enterprise level digital processor which monitors and controls the operation from a central location. Besides soliciting sensor information from all MFPCU's, unit 12 also monitors the loading of the utility feeder line to the enterprise; in this way it can be used to control the MFPCU's to limit the peak utility power used by adaptively sharing the power available with load requirements thereby reducing peak surcharges.

Figure 1A:
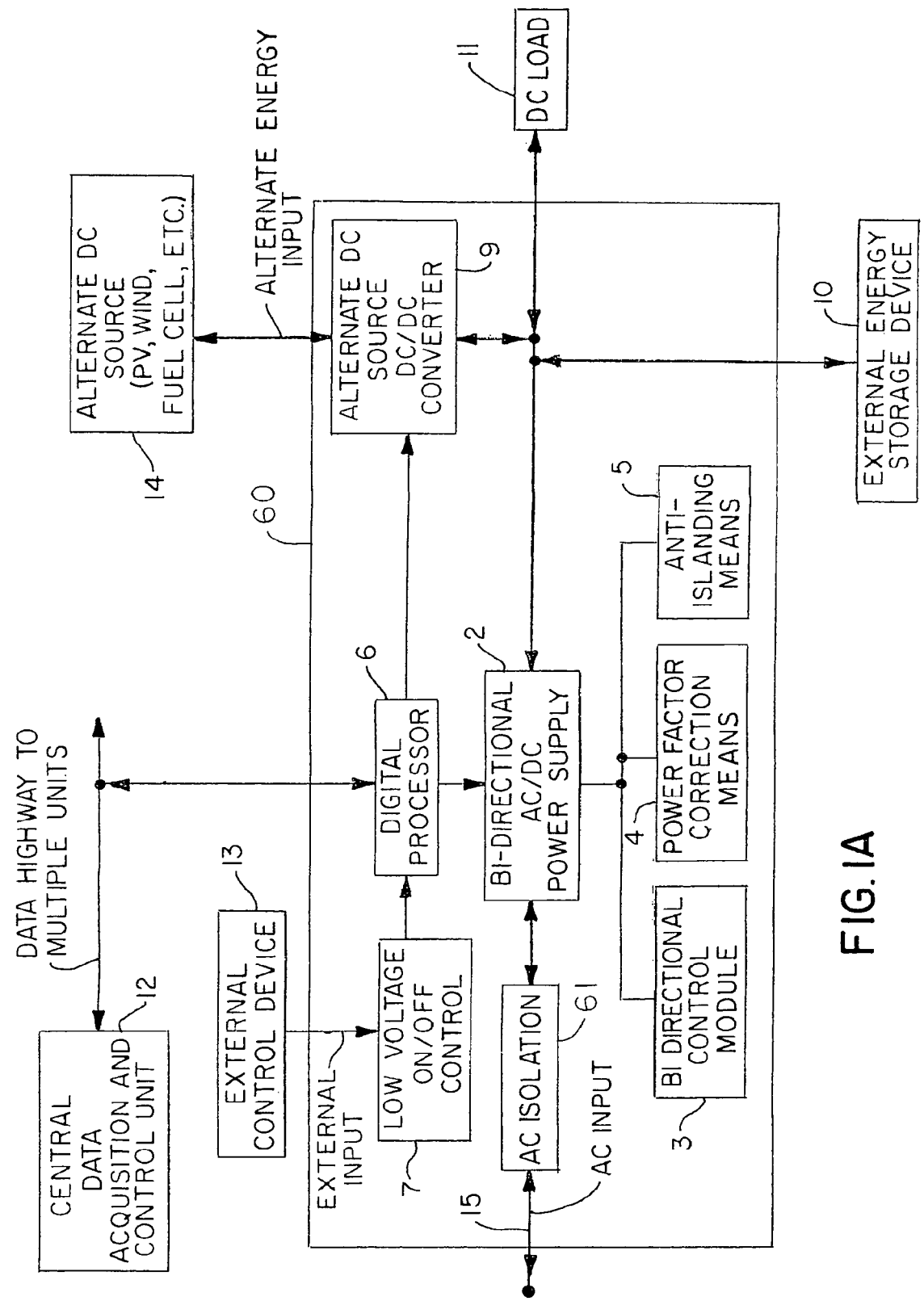
FIG. 1A is a block diagram of an alternate embodiment of a multi-function power control unit (MFPCU) of this invention with attachment blocks.

FIG. 1A shows a block diagram of multi-function power control unit (MFPCU) 60 which is an alternate embodiment of multi-function power control unit (MFPCU) 1 of FIG. 1. There is no change to the external blocks. In this embodiment of FIG. 1A, power isolation is handled by AC isolation block 61 right at power input 15. Thus all other blocks within multi-function power control unit (MFPCU) 60 are isolated from AC ground, thereby eliminating the need for DC isolation block 8 and simplifying the network.

While the various sensors for power, voltage and current are still used in FIG. 1A, they are now directly interfaced to digital processor 6, instead of being first intercepted and pre-processed by metering control module (MCM) block 23, as in FIG. 1.

Another change in FIG. 1A is that Low Voltage ON/OFF Control 7 is now interfaced to digital processor 6 which, in turn, controls the desired blocks. Otherwise, the functions of multi-function power control unit (MFPCU) 60 in FIG. 1A are the same as those of multi-function power control unit (MFPCU) 1 described above and shown in FIG. 1.

Figure 1B:
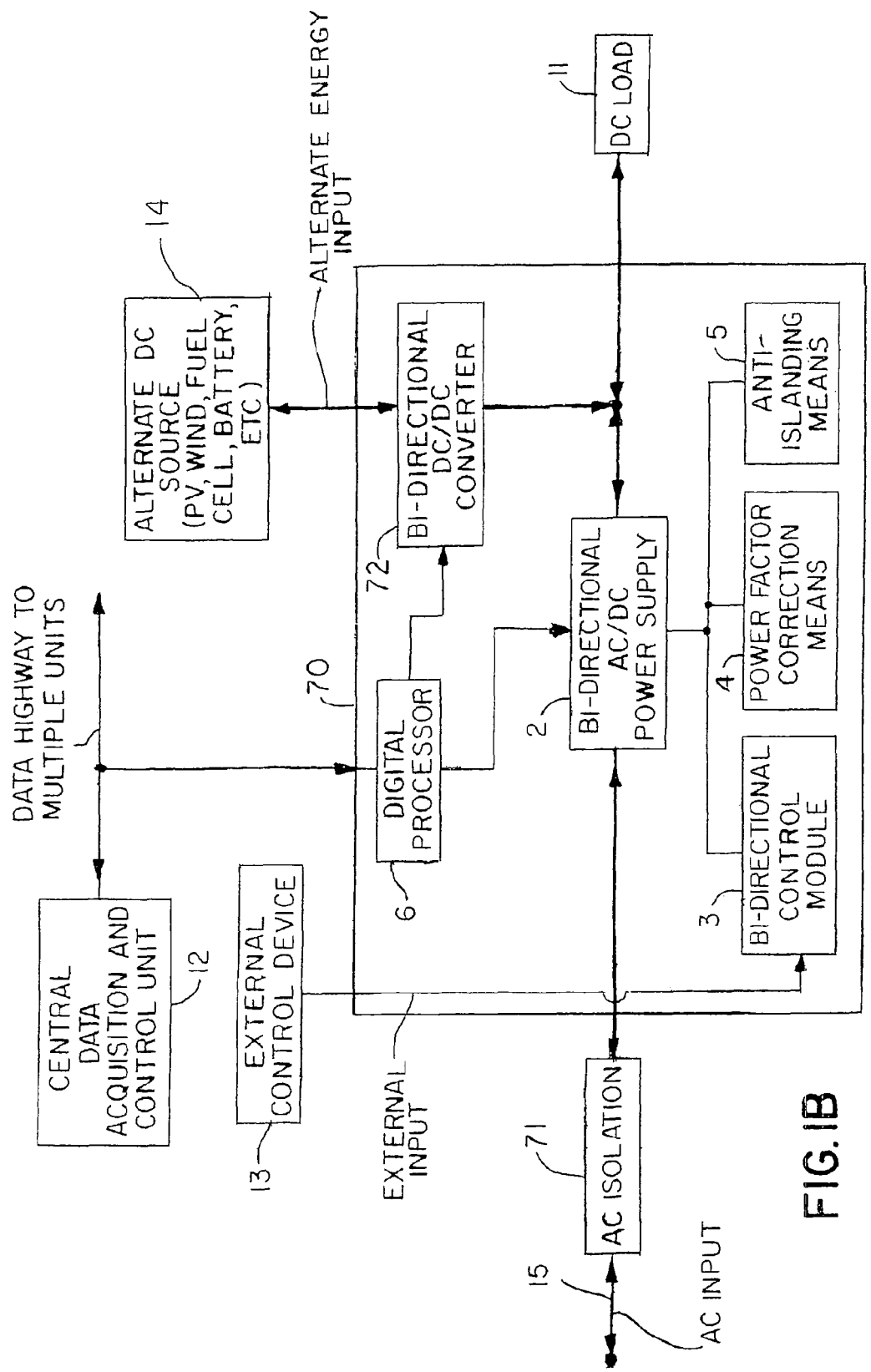
FIG. 1B is a block diagram of a second alternate embodiment of a multi-function power control unit (MFPCU) of this invention with attachment blocks.

FIG. 1B shows a second alternate embodiment, with multi-function power control unit (MFPCU) 70. One major change from multi-function power control unit (MFPCU) 60 of FIG. 1A is that AC isolation has been moved out of multi-function power control unit (MFPCU) 70 as external block 71. In this manner, existing transformers in the facility can be used for this purpose. External control device 13 now interfaces directly with Bi-Directional Control Module 3, bypassing digital processor 6 entirely, and eliminating the need for Low Voltage ON/OFF Control block 7, as shown in FIG. 1A. In some environments, the more direct control enhances the safety of the installation especially relating to locking out of the ability to feed back power to the AC input line.

Figure 2:
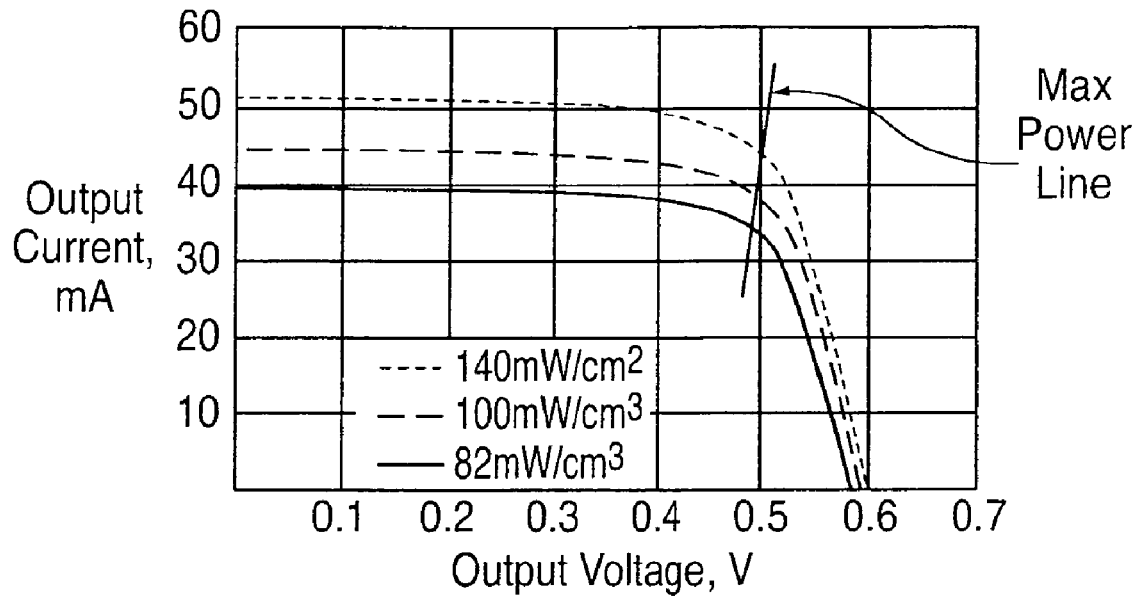
FIG. 2 is a chart of IV curves for typical solar cells showing maximum power load line.

FIG. 2 shows typical current/voltage curves for solar cells at different levels of incident irradiation (here ranging from 82 to 140 W/cm squared). The load line for maximum power collected is also drawn. The state-of-the-art control for extracting the maximum output from a solar array over varying operating conditions is known as maximum power point tracking or MPPT. This is achieved either by a predictive open-loop or by a closed-loop control system. In the MFPCU of this invention, MPPT is implemented by the buck/boost DC/DC converter of block 9 under control of digital processor 6. Solar panels used with the current MFPCU generate from 250 to 600 volts. The operating voltage of a lighting load is 380 VDC+/−1%. Thus alternate DC source DC/DC converter 9 will maintain this output while the input varies from 250 to 600 VDC; this is done in conjunction with MPPT protocols to maximize power transfer over dynamically changing conditions such as incident radiation and ambient temperature.

Figure 3:
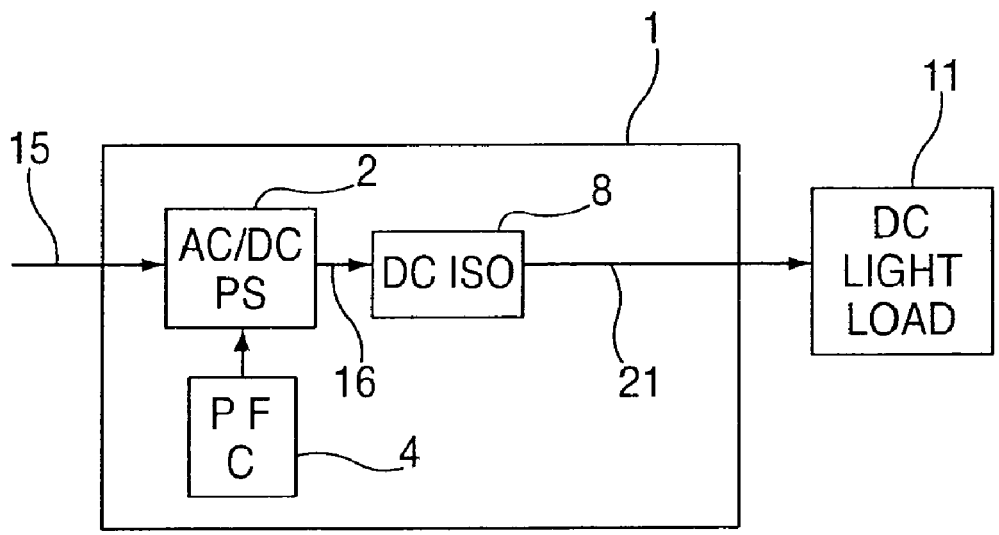
FIG. 3 is a Block diagram showing main current flow through the MFPCU for an AC Sourced High Efficiency Lighting mode.
Figure 4:
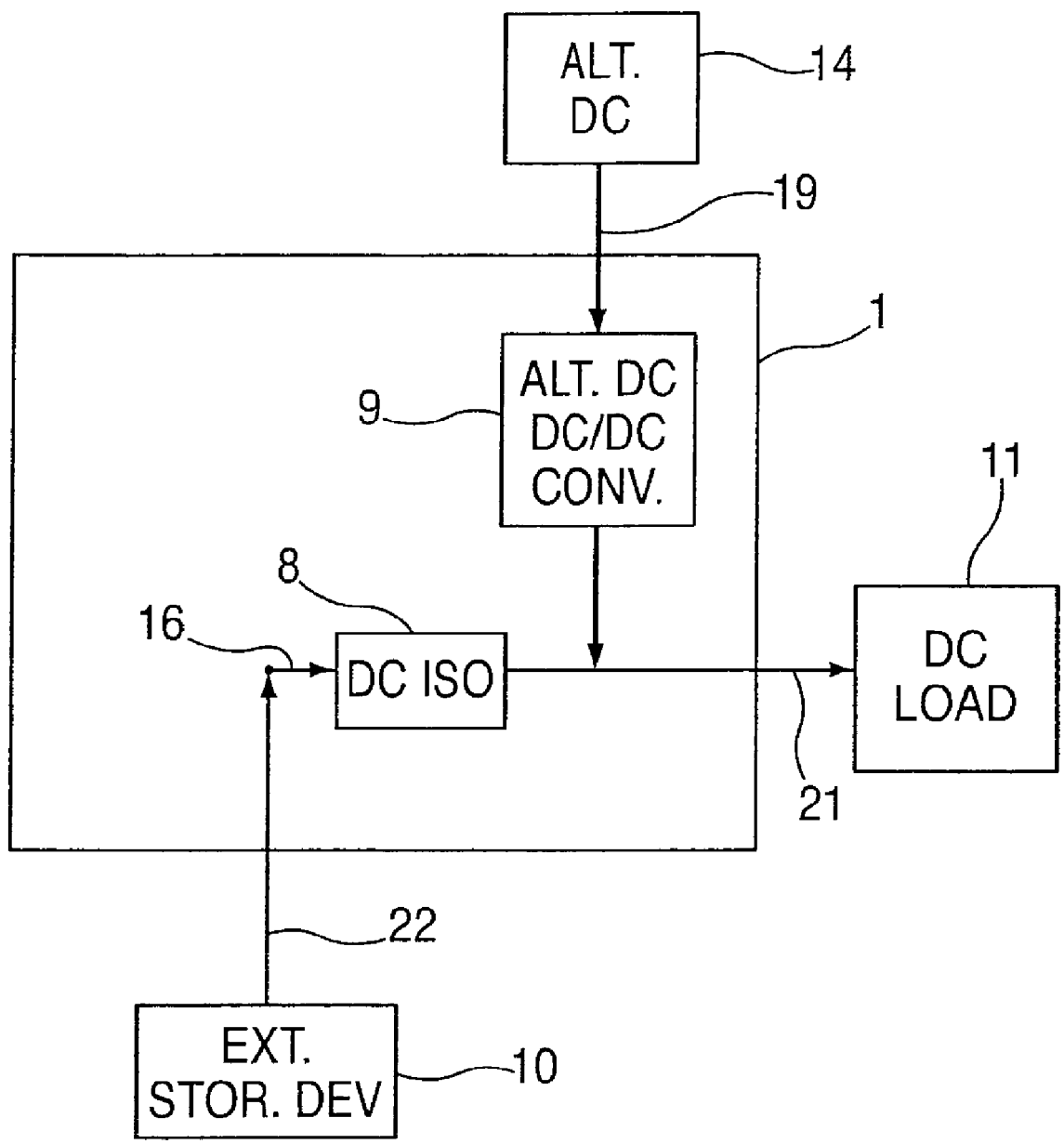
FIG. 4 is a Block diagram showing main current flow through the MFPCU for an AC Outage Operation mode.
Figure 5:
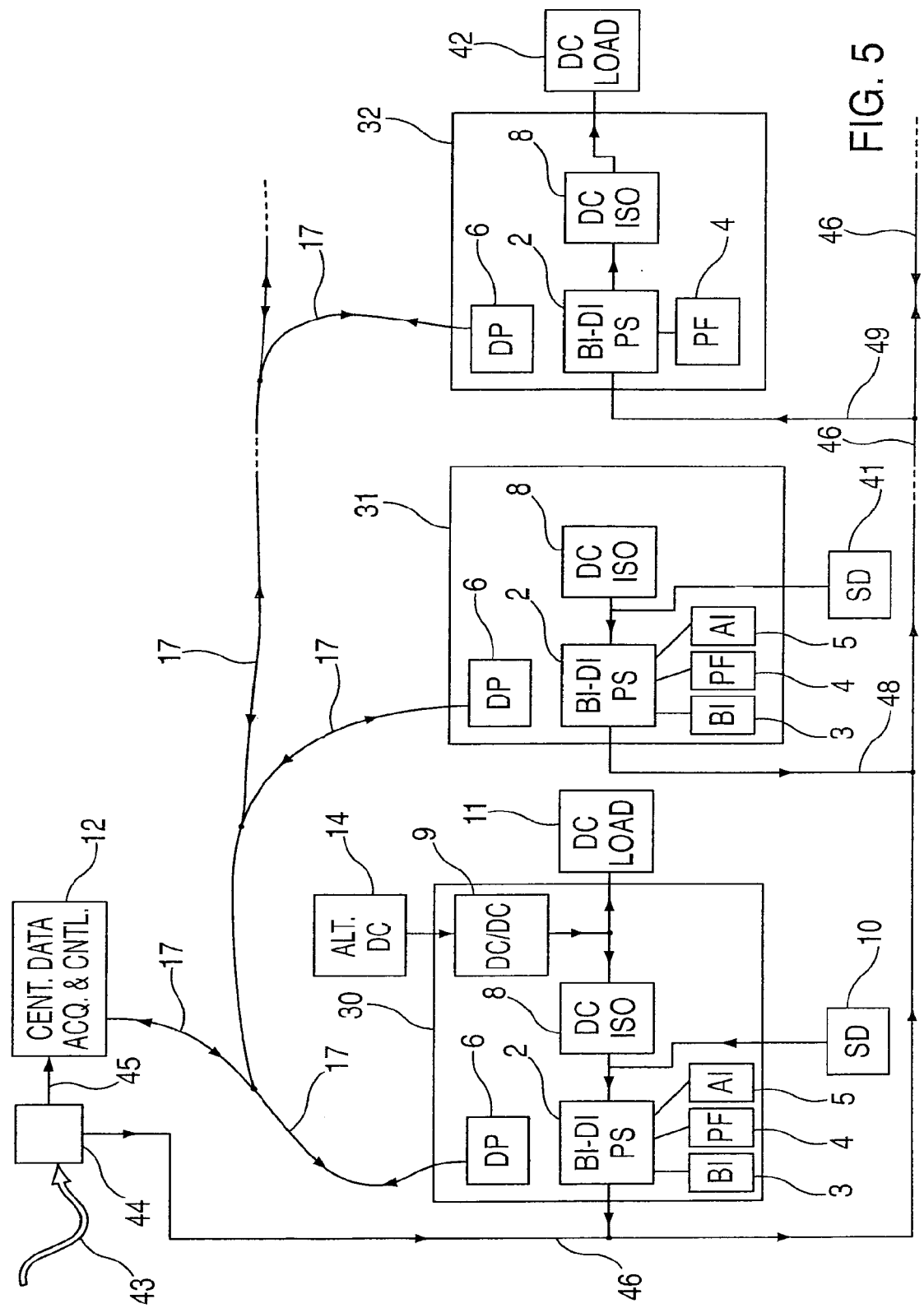
FIG. 5 is a Block diagram of enterprise with multiple MFPCU's in a Peak Shaving Enterprise AC Wheeling mode.

FIGS. 3-5 illustrate the main power flows through MFPCU blocks and paths for different modes of operation.

FIG. 3 shows the most typical mode of operation for an MFPCU. It illustrates AC sourced high efficiency lighting wherein load 11 is a fluorescent light load using DC-input ballasts. Utility AC power at 15 feeds into bi-directional AC/DC power supply 2 where it is converted (at unity power factor via power factor correction 4) to DC which flows toward DC isolation block 8 (via line 16) and onward to DC lighting load 11. In FIG. 3, no external storage device or alternate DC source are shown; they may simply not be implemented at this MFPCU, or they may just not be contributing power at this time.

FIG. 4 shows operation during a utility power outage. Power to supply DC load 11 is supplied via line 21 by alternate DC source 14 via line 19 through DC/DC converter 9 and by external storage device 10 via lines 22 and 16 through DC isolation block 8. Note that bi-directional power supply 2 is not involved in this operation since it is shut down by anti-islanding means 5.

FIG. 5 shows a multi-MFPCU enterprise operating so as to reduce power demand from utility feeder 43 entering distribution panel 44. Central data block 12 is sampling demand via line 45. Via network of bi-directional data lines 17, it can keep track of the status of each MFPCU. The distribution of utility power to each MFPCU is shown as a single line 46 (for simplicity) although multiple branch lines would probably be used. In this example, DC load 42 has heavy demand from MFPCU 32.

MFPCU 31 has its load shut down, but its storage device 41 has some capacity. MFPCU 30 is supplying its own load 11, but its storage device 10 has some capacity, and currently its alternate DC source 14 has capacity in excess of load 11 demand. Central data block 12 is aware of the status of each MFPCU and the impending peak utility demand threshold, therefore a "peak shaving" protocol is automatically entered. The bi-directional power supplies 2 of MFPCU's 30 and 31 are placed in inverter mode to feed back AC derived from DC sources via lines 47 and 48 respectively. This AC is combined with utility AC on branch lines 46 to supply heavy load 42 attached to MFPCU 32 via line 49. Note that bi-directional power supply 2 in MFPCU 32 remains in rectifier mode. Obviously there are an almost infinite number of similar scenarios that are possible on a second by second basis; this just illustrates a possible snapshot where AC is wheeled within the enterprise from one MFPCU to another.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A power controller, comprising:
    a bidirectional alternating current (AC) power connection for connection to a source of AC line power;
    a bidirectional direct current (DC) power connection for connection to a source of DC power;
    a bidirectional DC load connection for connection to a DC load having variable loading conditions during operation; and
    a bidirectional power supply operative, in response to the loading conditions of the DC load, for converting the AC line power to converted DC power for delivery to the DC load via the DC load connection, and for converting the DC power to converted AC power for delivery to the source of AC line power via the AC power connection.

2. The power controller in accordance with claim 1, and a bidirectional storage connection for connection to a DC storage device, wherein the DC storage device receives at least one of the DC power and the converted DC power via the storage connection, and wherein the DC storage device supplies stored DC power via the storage connection to at least one of the DC load, the source of DC power, and the bidirectional power supply for conversion to the converted AC line power for delivery to the source of AC power via the AC power connection.

3. The power controller in accordance with claim 2, and a converter for delivering at least one of the stored DC power from the DC storage device and the converted DC power from the bidirectional power supply to the source of DC power via the DC power connection.

4. The power controller in accordance with claim 2, and a processor for monitoring the loading conditions of the DC load, and for dynamically controlling at least one of the bidirectional power supply, the source of DC power, and the DC storage device to optimally deliver at least one of the converted DC power from the bidirectional power supply, the DC power from the source of DC power, and the stored DC power from the DC storage device to the DC load when the loading conditions require such DC power, and to the bidirectional power supply for conversion and delivery to the source of AC line power when the loading conditions do not require such DC power.

5. The power controller in accordance with claim 1, wherein the DC load is a lighting system.

6. The power controller in accordance with claim 1, wherein the source of AC line power is a utility mains line, and wherein the source of DC power is at least one of a wind turbine, a photovoltaic device, a fuel cell and a cogeneration device.

7. The power controller in accordance with claim 1, and a housing for containing the bidirectional power supply, and wherein the housing has a connector for each of the connections.

8. A system for controlling power delivery between a source of alternating current (AC) line power and a direct current (DC) load having variable loading conditions during operation, comprising:
  a source of DC power; and
  a power controller having a bidirectional AC power connection for connection to the source of AC line power, a bidirectional DC power connection for connection to the source of DC power, a bidirectional DC load connection for connection to the DC load, and a bidirectional power supply operative, in response to the loading conditions of the DC load, for converting the AC line power to converted DC power for delivery to the DC load via the DC load connection, and for converting the DC power to converted AC power for delivery to the source of AC line power via the AC power connection.

9. The system in accordance with claim 8, and a DC storage device, and wherein the power controller includes a bidirectional storage connection for connection to the DC storage device, wherein the DC storage device receives at least one of the DC power and the converted DC power via the storage connection, and wherein the DC storage device supplies stored DC power via the storage connection to at least one of the DC load, the source of DC power, and the bidirectional power supply for conversion to the converted AC power for delivery to the source of AC line power via the AC power connection.

10. The system in accordance with claim 9, wherein the power controller includes a converter for delivering at least one of the stored DC power from the DC storage device and the converted DC power from the bidirectional power supply to the source of DC power via the DC power connection.

11. The system in accordance with claim 9, wherein the power controller includes a processor for monitoring the loading conditions of the DC load, and for dynamically controlling at least one of the bidirectional power supply, the source of DC power, and the DC storage device to optimally deliver at least one of the converted DC power from the bidirectional power supply, the DC power from the source of DC power, and the stored DC power from the DC storage device, to the DC load when the loading conditions require such DC power, and to the bidirectional power supply for conversion and delivery to the source of AC line power when the loading conditions do not require such DC power.

12. The system in accordance with claim 8, wherein the DC load is a lighting system.

13. The system in accordance with claim 8, wherein the source of AC line power is a utility mains line, and wherein the source of DC power is at least one of a wind turbine, a photovoltaic device, a fuel cell and a cogeneration device.

14. The system in accordance with claim 8, and a housing for containing the bidirectional power supply, and wherein the housing has a connector for each of the connections.

15. The system in accordance with claim 8, and an additional power controller and a control unit for monitoring operation of each power controller.

16. A method of power control, comprising the steps of:
  bidirectionally connecting a source of alternating current (AC) line power to a power controller;
  bidirectionally connecting a source of direct current (DC) power to the power controller;
  bidirectionally connecting a DC load having variable loading conditions during operation to the power controller;
  converting the AC power to converted DC power for delivery to the DC load in response to the loading conditions of the DC load; and
  converting the DC power to converted AC power for delivery to the source of AC line power in response to the loading conditions of the DC load.

17. The method in accordance with claim 16, and bidirectionally connecting a DC storage device to the power controller, the DC storage device receiving at least one of the DC power and the converted DC power, and the DC storage device supplying stored DC power to at least one of the DC load, the source of DC power, and the bidirectional power supply for conversion to the converted AC power for delivery to the source of AC line power.

18. The method in accordance with claim 17, and delivering at least one of the stored DC power from the DC storage device and the converted DC power from the bidirectional power supply to the source of DC power.

19. The method in accordance with claim 18, and monitoring the loading conditions of the DC load, and dynamically controlling at least one of the bidirectional power supply, the source of DC power, and the DC storage device to optimally deliver at least one of the converted DC power from the bidirectional power supply, the DC power from the source of DC power, and the stored DC power from the DC storage device to the DC load when the loading conditions require such DC power, and to the bidirectional power supply for conversion and delivery to the source of AC line power when the loading conditions do not require such DC power.

20. The method in accordance with claim 17, and configuring the DC load as a lighting system.

21. The method in accordance with claim 17, and configuring the source of AC line power as a utility mains line, and configuring the source of DC power as at least one of a wind turbine, a photovoltaic device, a fuel cell and a cogeneration device.

22. The method in accordance with claim 17, and containing the bidirectional power supply in a housing having respective connectors for the source of AC line power, the source of DC power, and the DC load.

23. The method in accordance with claim 17, and monitoring operation of an additional power controller.

* * * * *